United States Patent [19]

Perusich et al.

[11] Patent Number: 4,988,364

[45] Date of Patent: Jan. 29, 1991

[54] COATED CATION EXCHANGE YARN AND PROCESS

[75] Inventors: Stephen A. Perusich, Newark; James T. Keating, Wilmington, both of Del.

[73] Assignee: E. I. Du Pont de Nemours and Company, Wilmington, Del.

[21] Appl. No.: 316,636

[22] Filed: Feb. 28, 1989

[51] Int. Cl.$^5$ .................. B05D 3/06; B05D 3/10; D06M 14/10; D06M 14/28; D06M 15/256; D06M 101/22

[52] U.S. Cl. .................. 8/115.52; 8/115.53; 8/115.56; 8/115.62; 8/115.63; 8/115.68; 8/115.69; 57/258; 210/660; 210/679; 210/500.1; 210/508; 423/DIG. 14; 427/36; 427/41; 427/44; 427/54.1; 427/341; 427/342; 427/389.9; 428/378; 428/394; 428/421; 428/422; 521/31; 521/32; 521/38

[58] Field of Search .......... 8/115.53, 115.56, 115.68, 8/115.69, 115.52, 115.62, 115.63; 57/258; 427/341, 342, 389.9, 36, 41, 44, 54.1; 428/378, 394, 421, 422; 521/32, 38, 31; 210/660, 679, 500.1, 508

[56] References Cited

U.S. PATENT DOCUMENTS

| | | | |
|---|---|---|---|
| 3,985,501 | 10/1976 | Grot et al. | 8/115.5 |
| 4,437,951 | 3/1984 | Bissot et al. | 204/98 |
| 4,778,723 | 10/1988 | Carl et al. | 428/394 |

FOREIGN PATENT DOCUMENTS

| | | |
|---|---|---|
| 57/25330 | 7/1980 | Japan . |
| 58-37030 | 3/1983 | Japan . |
| 60-26141 | 6/1985 | Japan . |
| 62-210336 | 8/1987 | Japan . |

*Primary Examiner*—James C. Cannon
*Attorney, Agent, or Firm*—Craig H. Evans

[57] ABSTRACT

A sheath/core yarn having as its core a fluorinated cation exchange resin, oriented at least 1x, in alkali metal salt form and as its sheath an unoriented or oriented melt-fabricable precursor or derivative of the same salt-form fluorinated cation exchange resin. The invention also includes various processes for making the sheath/core yarn.

18 Claims, No Drawings

COATED CATION EXCHANGE YARN AND PROCESS

Fluorinated cation exchange membranes are widely used in the electrolysis of alkali metal chlorides, among other uses. Lower voltage—i.e., lower membrane resistance—and higher current efficiency are greatly desired, because these two factors determine the amount of electrical power required for the electrolysis.

Wet cation exchange membranes have rather poor tear strength, and nearly all of them are now fabric-reinforced, though considerable work has been done with unreinforced films and with fibril-reinforced films. The reinforcement is usually made of perfluorinated polymers, such as homopolymers and melt-fabricable copolymers of tetrafluoroethylene (TFE), because they have enough chemical resistance to withstand exposure to caustic and chlorine. In some cases, as taught in U.S. Pat. No. 4,437,951, sacrificial yarns may also be used for special advantages.

Perfluorinated fabrics have some disadvantages, since they block the straight flow of alkali metal cations through the membrane, increase the resistance of the membrane, and result in uneven current distribution within the membrane. For this reason, open fabrics have been generally preferred to minimize membrane resistance, which raises cell voltage and power consumption. Also, when a melt-processible precursor to a cation exchange resin, which usually contains pendant groups ending in $-SO_2F$ or $-COOR$ groups, is laminated to a non-functional fabric, the functional polymer expands during hydrolysis and use, while the reinforcement does not. This can result in puckering of the film in the "window" areas between reinforcing yarns. This puckering is undesirable because it makes leak-tight sealing of the membrane in an electrolysis cell more difficult and provides recesses and protrusions that can trap gas which hinders ion flow.

Some consideration has been given to replacing the perfluorinated fabric with a cation exchange resin, but no really feasible process has yet been disclosed for making such a membrane.

U.S. Pat. No. 3,985,501 describes the melt spinning of an oriented filament of a perfluoropolymer with side chains terminating in $-SO_2F$ groups, followed by weaving into a liquid-impermeable fabric, followed by hydrolysis to the cation exchange form. This fabric was not used for reinforcing a cation exchange film laminate. When a low denier oriented unhydrolyzed yarn such as this is used to weave a fabric, the elasticity of the yarns causes the yarns in the fabric to become shorter when the fabric is removed from the loom, causing the fabric to pucker into a crepe fabric and causing further shrinkage in the laminator. Such a fabric with built-in strain is undesirable for use in reinforcing a cation exchange membrane.

Japanese Laid-open Application No. J57/25330 replaces part but not all of the non-functional perfluorocarbon polymer yarns with unoriented cation exchange yarns. The cation exchange yarns do not strengthen the fabric but only stabilize it against distortion. The only example in this application gave a current efficiency of 94% and an electrode-to-electrode voltage of 3.46 volts.

In copending application 07/316,630 now U.S. Pat. No. 4,964,960, lower voltage is achieved by using a reinforcing fabric made of oriented and hydrolyzed yarn of material similar to that of the membrane to be reinforced. With such yarns and fabric, improved adhesion or bonding between the hydrolyzed yarn and the melt-processible film as well as improved fabric stability, that is, resistance to shifting of fibers during handling prior to lamination, are desired.

Bonding is important when the membrane is hydrolyzed, causing the melt-processible resin to swell. Without sufficient adhesion of the fabric to the film, the film will pull away from the fabric, leaving free space. Reduction or elimination of any free space between the reinforcement and the film after final hydrolysis means less or no volume of liquid in the membrane. Such liquid regions distort current flow during operation, because they are more conductive than the polymer. On shutdown, chlorine and hypochlorite in the liquid regions cannot be easily flushed out. These chemicals can diffuse toward the cathode, attacking it and allowing ions from the cathode metal to be absorbed by the membrane, undesirably raising cell voltage.

Stability is important since shifting of fibers during handling results in a final membrane of less than fully satisfactory properties. With shifting, the membrane would have areas that are unreinforced or poorly laminated. Such a membrane would suffer from uneven current distribution in use. The fabric in such a membrane may be thick in places leading to, during lamination, incomplete encapsulation and resulting leakage of electrolyte.

In the present invention, the oriented, hydrolyzed yarn is coated with melt-processible copolymer or superficially converted to melt-processible form prior to being made into a fabric for lamination into a membrane. Alternatively, a fabric is made from oriented, hydrolyzed, fluorinated cation exchange resin and then coated with melt-processible copolymer or superficially converted to melt-processible form. The melt-processible coat or sheath readily bonds to the melt-processible film with which the fabric is laminated to make a membrane, thus improving adhesion.

In the present invention, the yarns are better for weaving into a stable fabric than un-coated yarns because coated yarns readily bond to each other, preventing shifting of the yarns in the fabric during handling.

With the present invention, tightly-woven fabrics may be used for strength, because after final hydrolysis the entire structure will be ion-conductive. Also, since the fabric has improved wettability by films of melt-processible copolymers used in making membranes, tighter-woven fabrics may be used without encountering problems due to voids in the laminates.

SUMMARY OF THE INVENTION

A coated cation exchange yarn (also referred to herein as sheath/core yarn) has been invented It has, after hydrolysis, a denier between 50 and 400 grams per 9000 meters (g/9000 m). It comprises a core that is an oriented fluorinated cation exchange resin, oriented, preferably by being stretched or drawn at least 1x, sufficiently to provide a minimum tenacity after hydrolysis of 0.5 grams per denier (g/denier). On the core is a coating (sheath) that is a melt-fabricable precursor to a fluorinated cation exchange resin. Both the sheath and core have a mole ratio of non-functional:functional monomer of 2.8–11.8:1, the ratio for the sheath and the ratio for the core being within three units, preferably one unit, of each other. A cation exchange fabric may be made, preferably by weaving or knitting, from this sheath/core yarn.

A coated cation exchange fabric has been invented. It comprises a base fabric that is an oriented, hydrolyzed, fluorinated cation exchange resin in which the mole ratio of non-functional:functional monomer is 2.8–11.8:1. On the base fabric is a thin layer of a melt-fabricable precursor to the fluorinated cation exchange resin (coating) covering a sufficient portion of the base fabric surface to assure good adhesion of the fabric to a film when laminating the film to the fabric to make a membrane. The coating may also be throughout the base such as when the base is made from coated yarn. The coating has a non-functional:functional monomer ratio that is within three units, preferably 1, of the ratio of the base fabric.

The yarn or fabric can be made by coating the oriented, hydrolyzed yarn core or fabric base with a solution, dispersion, or other liquid composition of the precursor resin, followed by removal of volatiles. For uniform or easier coating, it may be desirable to use low viscosity or high solids solutions of melt-fabricable polymer, prepolymer or oligomer which can be cross-linked, post-polymerized or otherwise cured with peroxides, heat, light or radiation.

The yarn or fabric can be made by making a yarn or fabric of oriented resin with —COOH groups on the pendant side chains by hydrolyzing a hydrolyzable precursor in oriented yarn form, converting it into a fabric if desired, and then esterifying the surface of this yarn or fabric to make a melt-processible sheath.

The yarn or fabric can be made by making a yarn core or fabric base of oriented resin with alkali metal sulfonate groups on the pendant side chains by hydrolyzing a hydrolyzable precursor in oriented yarn form, converting it into a fabric if desired, and then converting the surface of this yarn or fabric to make a melt-processible sheath or coating with —SO$_3$H, —SO$_2$Cl, or —SO$_2$F end groups or end groups of a fusible sulfonate salt.

The fabric can be melt-laminated with at least one film of at least one melt-processible fluorinated cation exchange resin precursor in which the non-functional:-functional group ratio is within three units, preferably one unit, of that of the sheath or coating resin.

After hydrolysis, the membrane may be used as an ion-exchange membrane particularly to electrolyze alkali metal halide solution to make halogen and alkali metal hydroxide.

Because of the oriented core, the laminate has enough stiffness and strength, particularly tear strength, to be handled during preswelling and mounting in a cell. Because the sheath has good adhesion to the core and to the film or films, the final laminate has good integrity and does not delaminate even during the swelling that accompanies hydrolysis.

DETAILS OF THE INVENTION

Core and sheath sections of a cation exchange yarn, which are useful, among other things, in making reinforcing fabrics to be laminated with films to make membranes, may be made of carboxylic polymers, sulfonyl polymers or a combination of the two. The same polymers may be used to make base fabrics and their coatings as well as the films which are laminated to the fabric to make membranes. It is preferred that the layer of the membrane which is mounted next to the catholyte be made of a carboxylic polymer.

The carboxylic polymers with which the present invention is concerned have a fluorinated hydrocarbon backbone chain to which are attached the functional groups or pendant side chains which in turn carry the functional groups. When the polymer is in melt-fabricable form, the pendant side chains can contain, for example,

groups wherein Z is F or CF$_3$, t is 1 to 12, and W is —COOR or —CN, wherein R is lower alkyl. Preferably, the functional group in the side chains of the polymer will be present in terminal

groups wherein t is 1 to 3.

The term "fluorinated polymer", as used herein, for carboxylic and for sulfonic polymers, means a polymer in which, after loss of any R group by hydrolysis to ion exchange form, the number of F atoms is at least 90% of the total number of F, H, and Cl atoms in the polymer. For chloralkali cells, perfluorinated polymers are preferred, though the R in any COOR group need not be fluorinated because it is lost during hydrolysis.

Polymers containing

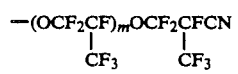

side chains, in which m is 0, 1, 2, 3 or 4, are disclosed in U.S. Pat. No. 3,852,326.

Polymers containing —(CF$_2$)$_p$COOR side chains, where p is 1 to 18, are disclosed in U.S. Pat. No. 3,506,635.

Polymers containing

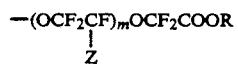

side chains, where Z and R have the meaning defined above and m is 0, 1, or 2 (preferably 1) are disclosed in U.S. Pat. No. 4,267,364.

Polymers containing terminal —O(CF$_2$)$_v$W groups, where W is as defined above and v is from 2 to 12, are preferred. They are disclosed in U.S. Pat. Nos. 3,641,104, 4,178,218, 4,116,888, British No. 2,053,902, EP No. 41737 and British No. 1,518,387. These groups may be part of

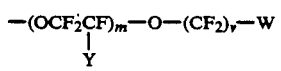

side chains, where Y=F or CF$_3$ or CF$_2$Cl. Especially preferred are polymers containing such side chains where v is 2, which are described in U.S. Pat. No. 4,138,426 and U.S. Pat. No. 4,487,668, and where v is 3, which are described in U.S. Pat. No. 4,065,366. Among these polymers, those with m=1 and Y=CF$_3$ are most preferred.

The above references describe how to make these polymers.

The sulfonyl polymers with which the present invention is concerned are fluorinated polymers with side chains containing the group $$-CF_2CFSO_2X,$$
$$\phantom{-CF_2C}|$$
$$\phantom{-CF_2CF}R_f$$

wherein $R_f$ is F, Cl, $CF_2Cl$ or a $C_1$ to $C_{10}$ perfluoroalkyl radical, and X is F or Cl, preferably F. Ordinarily, the side chains will contain $-OCF_2CF_2CF_2SO_2X$ or $-OCF_2CF_2SO_2F$ groups, preferably the latter. For use in chloralkali membranes, perfluorinated polymers are preferred.

Polymers containing the side chain $$-O(CF_2CFO)_k-(CF_2)_j-SO_2F,$$
$$\phantom{-O(CF_2C}|$$
$$\phantom{-O(CF_2}CF_3$$

where k is 0 or 1 and j is 3, 4, or 5, may be used. These are described in British No. 2,053,902.

Polymers containing the side chain $-CF_2CF_2SO_2X$ are described in U.S. Pat. No. 3,718,627.

Preferred polymers contain the side chain $$-(OCF_2CF)_r-OCF_2CFSO_2X,$$
$$\phantom{-(OCF_2}|\phantom{)_r-OCF_2CF}|$$
$$\phantom{-(OCF_2C}Y\phantom{)_r-OCF_2CF}R_f$$

where $R_f$, Y, and X are as defined above and r is 1, 2, or 3, and are described in U.S. Pat. No. 3,282,875. Especially preferred are copolymers containing the side chain $$-OCF_2CFOCF_2CF_2SO_2F.$$
$$\phantom{-OCF_2C}|$$
$$\phantom{-OCF_2}CF_3$$

Polymerization can be carried out by the methods described in the above references. Especially useful is solution polymerization using $ClF_2CCFCl_2$ solvent and $(CF_3CF_2COO)_2$ initiator. Polymerization can also be carried out by aqueous granular polymerization as in U.S. Pat. No. 2,393,967, or aqueous dispersion polymerization as in U.S. Pat. No. 2,559,752 followed by coagulation as in U.S. Pat. No. 2,593,583.

The copolymers used herein should be of high enough molecular weight to produce films which are self-supporting in both the melt-fabricable precursor form and in the hydrolyzed ion-exchange form.

A membrane having at least one layer of a copolymer having sulfonyl groups in melt-fabricable form and a layer of a copolymer having carboxyl groups in melt-fabricable form, such as made by coextrusion, can be used as one of the component films in making the membrane of the invention. Such a laminated structure may be referred to as a bimembrane. Preparation of bimembranes is described in Japanese Laid-open Application No. K52/36589, published as J83/33249.

The customary way to specify the structural composition of films or membranes in this field is to specify the polymer composition, the ion-exchange capacity or equivalent weight or ratio of nonfunctional to functional monomer, and thickness of the polymer films in melt-fabricable form from which the membrane is fabricated. This is done because the measured thickness varies depending on whether the membrane is dry or swollen with water or an electrolyte, and even on the ionic species and ionic strength of the electrolyte, even though the amount of polymer remains constant.

For use in ion-exchange applications and in cells, for example a chloralkali cell for electrolysis of brine, the membrane should have all of the functional groups converted to ionizable functional groups. These will be sulfonic acid and carboxylic acid groups, or preferably alkali metal salts thereof. When the term "sulfonic ion-exchange groups" is used, it includes not only the sulfonic acid group but particularly the alkali metal salts thereof. Similarly, the term "carboxylic ion-exchange groups" means the carboxylic acid group and particularly the alkali metal salts thereof. The alkali metals preferred for use in this invention are potassium and sodium, particularly sodium, which leads to the production of sodium hydroxide.

Conversion to ionizable functional groups is ordinarily and conveniently accomplished by hydrolysis with acid or base, such that the various functional groups described above in relation to the melt-fabricable polymers are converted respectively to the free acids or the alkali metal salts thereof. Such hydrolysis can be carried out in an aqueous bath of mineral acid or alkali metal hydroxide. Hydrolysis in the hydroxide is preferred as it is faster and more complete. Use of hot hydrolysis baths, such as near the boiling point of the solution, is preferred for rapid hydrolysis. The time required for hydrolysis increases with the thickness of the structure. It is advantageous to include a water-miscible organic compound such as dimethyl sulfoxide in the hydrolysis bath, to swell the membrane to increase the rate of hydrolysis.

The carboxylic and sulfonic polymers used in the invention for the yarns, the fabrics and the films which are used in making membranes have a mole ratio of non-functional:functional monomer of 2.8–11.8:1, preferably 5.3–7.5:1. TFE typically is the non-functional monomer used and will therefore be generally used throughout this specification. Other non-functional monomers are considered to be substitutable for TFE in all cases referring to TFE alone. If the ratio is lower than 2.8:1, the copolymer will tend to be soft and difficult to handle and have an excessively high water absorption. If the ratio is higher than 11.8:1, the membrane will have a high resistance (high voltage).

The yarn, fabric and film for a particular laminate should have end groups selected from sulfonyl end groups and carboxyl end groups. Sulfonyl includes the alkali metal salt, fusible salts, $-SO_2F$, $-SO_2Cl$, and $-SO_3H$ end groups. Carboxyl includes $-COOH$, $-COOR$ where R is lower alkyl (that is, $C_{1-5}$ alkyl), $-CN$ and carboxyl salts.

The mole ratio of TFE:functional monomer should not vary by more than 3 units, preferably 1 unit, between the core and sheath or between the sheath and the film laminated to the fabric.

Those skilled in the art will realize that the optimum mole ratio will depend on the structure of the polymer or polymers used in the membrane. For example, if the pendant side chain containing the functional group is short, relatively high mole ratios may be used. If the thickness of the membrane is at the high end of the range mentioned, the resistance will be relatively high, and low mole ratios will be desired. If the membrane is carboxylic rather than sulfonyl, the resistance will be relatively high, and low mole ratios will be desired If caustic outside the 30–35 wt. % range is desired, high mole ratios in the range 7.5–8.5:1 may be preferred.

The core yarn may be monofilament or multifilament. The sheath is placed partially or entirely around the core.

The yarns may be of ordinary round cross-section or may have specialized cross-sections. Oblong or rectangular cross-sections, if suitably oriented in a fabric to the membrane, make it possible to get more reinforcing action with a thinner overall membrane.

The core yarns must be oriented before hydrolysis, but the orientation process is not critical. Orientation can be done by drawing during spinning as the yarn comes from the spinneret. Yarn may also be oriented by drawing in a separate step after spinning is finished. While being stretched in a separate step, the yarn is heated on a hot surface, through a heated tube, or by passing through steam. The amount of stretching or drawing should not be so great as to cause breaks in constituent filaments of multifilament yarns, and is normally 2 to 4 times the unstretched length. The degrees of orientation and hydrolysis should be sufficient to give the core yarn a minimum tenacity of 0.5 g/denier and a minimum tensile modulus of 2 g/denier after hydrolysis and superficial drying. Higher tenacities and tensile moduli are preferred. If the tenacity is too low, breaks may occur during the coating process or on the loom. If the tensile modulus is too low, the core yarn will be difficult to feed into the coating die, especially when starting a run, and too elastic to weave well on the loom.

Hydrolyzed cation exchange yarn is several times as stiff as unhydrolyzed yarn made of the precursor resin, as shown in the Examples.

The coated cation exchange fabric may be made, among other ways, from hydrolyzed yarns by any known method such as weaving or knitting. When woven, fabrics may be of various weaves, such as the plain weave, basket weave, leno weave, or others. The yarns may be sheath/core yarns thus imparting the coating throughout the fabric or the fabric base formed may have the coating added after being formed into a fabric.

When woven, the weave used is not critical and the maximum yarn count is not critical because the yarn becomes conductive before the laminate is used as an ion-exchange membrane and, due to the coating, openings in the weave are not needed to facilitate lamination of the fabric to film. Yarn counts of 1 to 50 yarns per centimeter, preferably from 25 to 40, can be used.

When knitted, any known method of knitting may be used. These include single, double, full fashion, tricot and raschel knitting. Gauge is not critical for the same reasons as with woven fabric. Gauges up to 66, preferably 10 to 40, can be used.

While not preferred, it may be desirable to use soluble or degradable fibers, such as rayon or polyester, along with the functional fibers. They may be used because, after final hydrolysis and use of the assembled membrane when these fibers are solubilized or degraded, the resistance of the membrane will be decreased. Care should be taken, however, not to have the soluble or degradable fibers extend from one surface to the other, or the non-porous membrane will become a porous diaphragm and, in the case of a chloralkali cell, the caustic product will contain too much salt.

To reduce its thickness, coated fabric may be heat set and/or calendered before lamination with film to make membranes.

Membranes usually have an overall thickness of 50–250 micrometers, especially 125–200 micrometers.

The coated fabric can be melt-laminated with at least one film of at least one melt-processible fluorinated cation exchange resin precursor in which the non-functional:functional group ratio is within three units, preferably one unit, of that of the sheath or coating resin to make a membrane or multiple-membrane.

In a bimembrane, the fabric may be in the sulfonic or carboxylic layer or both, but preferably is in the sulfonic layer, which is usually thicker. In place of fabric, nonwoven fibrils can be used.

Membranes or bimembranes may be used flat in various known filter press cells, or may be shaped around an electrode. The latter is especially useful when it is desired to convert an existing diaphragm cell to a membrane cell in order to make higher quality caustic.

Membranes can be swelled with polar solvents (such as lower alcohols or esters, tetrahydrofuran, or chloroform) and then dried, preferably between flat plates, to improve their electrolytic performance. Before mounting in commercial cell support frames, which may be 1–3 meters on a side, the membrane can be swelled so that it will not wrinkle after it is clamped in the frame and exposed to electrolytic fluids. Among the swelling agents that can be used are water, brine, caustic, lower alcohols, glycols, and mixtures thereof.

The membranes described herein can also be modified on either surface or both surfaces thereof so as to have enhanced gas release properties, for example by providing optimum surface roughness or smoothness by hot roll embossing or by embossing with a porous paper. When embossing with a porous paper, a release paper can be applied to an outer surface of the membrane prior to passing through a laminator used, for example, to apply a reinforcement for the membrane. Such surface embossing is further described in U.S. Pat. No. 4,349,422. Preferably the resulting surface roughness is about 2–5 micrometers as measured, for example, on a Bendix Model 1020 profilometer.

Cells can have two or three compartments, or even more. If three or more compartments are used, the membrane is commonly used next to the cathode compartment, and the other dividers may be porous diaphragms or membranes based on polymers having pendant side-chains with terminal $-CF_2SO_3^-$ ion-exchange groups only.

Bipolar or monopolar cells can be used. In ordinary use, the carboxylic side of the membrane will face the cathode. One can use (n) cells in series, with anolyte flowing from first cell (1) to cell (n) and catholyte flowing from cell (n) to cell (1). The cells may use identical membranes or different membranes may be used in different cells. Membranes using only polymers having pendant side chains with terminal $-CF_2SO_3^-$ groups may be used in cell (n) and possibly others near it. Cell (n) may be two or more cells in parallel.

The membrane may be disposed horizontally or vertically in the cell, or at any angle from the vertical.

Any of the conventional electrodes or electrode configurations may be used. The anode for a chloralkali cell should be resistant to corrosion by brine and chlorine, resistant to erosion, and preferably should contain an electrocatalyst to minimize chlorine overvoltage. The well-known dimensionally stable anode is among those that are suitable. A suitable base metal is titanium, and the electrocatalysts include reduced platinum group metal oxides (such as Ru, and the like) singly or in mixtures, optionally admixed with a reduced oxide of Ti, Ta, Nb, Zr, Hf, V, Pt, or Ir. The electrocatalysts may be heat treated for stability.

The anode may be a 'zero-gap' anode, against which the membrane is urged, the anode being permeable to both liquids and gases. Alternatively, the anode may be kept a small distance from the membrane by the use of a spacer, against which the membrane is urged by a small hydraulic head on the other side of the membrane. The spacer may be made of a plastic which is resistant to the chemicals in the anolyte, such as polytetrafluoroethylene, ethylene/tetrafluoroethylene copolymer, or polychlorotrifluoroethylene. It is desirable that the spacer or the electrode should have open vertical channels or grooves to facilitate the escape of gas evolved at the anode.

Whether or not there is a spacer, it may be desirable to have the anode openings slanted so the gas is carried away from the membrane and so that anolyte circulation past the membrane is maximized. This effect can be augmented by using downcomers for anolyte which has been lifted by the rising gas bubbles.

The anode may be a screen or a perforated plate or a powder, any of which may be partially embedded in the anode surface layer of the membrane When the anode is embedded, the current may be supplied to the anode by current distributors which contact the anode at numerous closely-spaced points. The anode may be a porous catalytic anode attached to or pressed against the membrane or attached to or pressed against a porous layer, which is in turn attached to or pressed against the membrane.

The cathode for a chloralkali cell should be resistant to corrosion by the catholyte, resistant to erosion, and preferably contain an electrocatalyst to minimize hydrogen overvoltage. The cathode may be mild steel, nickel, or stainless steel, for example, and the electrocatalyst may be platinum black, palladium, gold, spinels, manganese, cobalt, nickel, Raney nickel, reduced platinum group metal oxides, alpha-iron and the like.

The cathode may be a 'zero-gap' cathode, against which the membrane is urged, the cathode being permeable to both liquids and gases. Alternatively, the cathode may be kept a small distance from the membrane by the use of a spacer, against which the membrane is urged by a small hydraulic head on the other side of the membrane In the case of a three-compartment cell, both membranes may be urged against electrodes or spacers by a hydraulic head on the center compartment. The spacer may be made of a plastic which is resistant to the chemicals in the catholyte, such as polytetrafluoroethylene, ethylene/tetrafluoroethylene resin, or polychlorotrifluoroethylene. It is desirable that the cathode spacer or electrode have open vertical channels or grooves to facilitate the escape of gas evolved at the cathode.

Whether or not there is a spacer, it may be desirable to have the cathode openings slanted so the gas is carried away from the membrane and catholyte flow past the membrane is maximized. This effect may be augmented by using downcomers for catholyte which has been lifted by rising gas bubbles. The cathode may be a porous cathode, pressed against the membrane or pressed against a porous layer, which is in turn attached to or pressed against the membrane.

An oxygen cathode can be used, in which oxygen is supplied to the cathode and substantially no hydrogen is evolved, with the result being lower cell voltage. The oxygen may be supplied either by bubbling through the catholyte and against the cathode, or by feeding oxygen-containing gas through a porous inlet tube which also serves as cathode and is coated with electrocatalyst.

It has long been known that in the electrolysis of brine to make chlorine and caustic, it is desirable to use sodium chloride (NaCl) having low calcium (Ca) and magnesium (Mg) content (hardness). It is also well known how to remove hardness from NaCl solutions to very low levels. Heavy metals (such as iron and mercury) and foreign anions (such as iodide and sulfate) should also be substantially removed. Some of the contaminants in make-up brine can be removed by passing the brine through a diaphragm cell before it is fed to the membrane cell system. Further hardness reductions can be achieved by passing the brine through a chelate ion exchanger, preferably one containing —$NHCH_2COOH$ groups, or a phosphate may be added to the brine to precipitate insoluble salts.

Brine fed to the cell is usually close to the saturation concentration, but lower brine concentration is acceptable. Brine leaving the anolyte chamber may be as low as about 2 wt. % NaCl, but is more often 10–15 wt. % NaCl, or even higher.

Because a bimembrane or three-layer membrane has lower electrical resistance than an all-carboxylic membrane, it can be operated at lower voltage or higher current density. Good results can be obtained at a current density of 1.0–7.0 kiloamperes per square meter ($kA/m^2$), preferably 3.0–5.0 $kA/m^2$.

It is desirable to acidify the anolyte to minimize the formation of oxygen and chlorate at the anode.

Anolyte acidity is normally adjusted to a value in the range of pH 1–5 by addition of hydrochloric acid or hydrogen chloride to the recycle brine. Recycle brine may be concentrated by addition of solid salt and/or by evaporating or distilling water from the stream.

While membrane cells are frequently operated at approximately atmospheric pressure, there can be advantages to operating them at elevated pressure While direct current is ordinarily used in membrane cells, one can also use pulsed direct current or half-wave AC or rectified AC or DC with a square wave.

Chloralkali synthesis is normally carried out at about 70–100° C. The catholyte can be kept 5–20° cooler than the anolyte temperature.

In any of the above arrangements, either or both of the electrodes can have a catalytically active surface layer of the type known in the art for lowering the overvoltage of an electrode. Such electrocatalyst can be of a type known in the art, such as those described in U.S. Pat Nos. 4,224,121 and 3,134,697, and UK No. 2,009,788A. Preferred cathodic electrocatalysts include platinum black, Raney nickel and ruthenium black. Preferred anodic electrocatalysts include platinum black and mixed ruthenium and titanium oxides.

There are several methods by which the sheath/core yarn of the present invention may be made.

Single or multiple coating steps with a solution or dispersion or other liquid composition of the copolymer in a form other than the alkali metal salt may be used. Among the known liquid compositions are those of the sulfonic acid form (UK No. 1,286,859 or U.S. Pat. No. 4,433,082), the —$SO_2F$ form (U.S. Pat. No. 4,348,310 and U.S. Pat. No. 4,650,551), and the —COOCH$_3$ form (U.S. Pat. No. 4,348,310 and Japanese Laid-open Application No. J55/149336) and the —COOH form (U.S. Pat. No. 4,385,150). Temperature, immersion time, and solution concentration are not critical, though multiple immersions may be needed if the liquid composition has a low polymer concentration or viscosity. The thickness of the sheath made by this process may be 2.5–13 micrometers, preferably 5–8 micrometers.

In the case where the yarn has —COOalkali metal or —SO$_3$alkali metal end groups, the outer surface can be converted to the free acid form by contacting the yarn with 5–10 wt. % aqueous mineral acid, such as HCl or HNO$_3$, for a time and temperature sufficient to convert the outer surface of the yarn to more melt-processible form, that is to —COOH or —SO$_3$H groups, respectively. The time can be short, such as 15 minutes at elevated temperatures as in a steam bath, or longer at lower temperatures. The time, temperature, and acid concentration can be varied to control penetration into the yarn so that the yarn will be melt-processible on the surface and hydrolyzed within. The conditions will vary with yarn composition, denier and whether it is a monofilament or a multifilament. The degree of conversion can be determined by cutting a cross-section of a sample of the yarn and staining with a cationic dye.

While the —COOH and SO$_3$H groups are more melt-processible than their alkali metal counterparts, they are so with difficulty.

In the case of the —COOH groups, it is preferable to make the outer surface more melt-processible (lower viscosity) and more compatible with the —COOR films used in the lamination step by esterification into the —COOR form, R being a lower alkyl (C$_{1-5}$). Esterification conditions are known to those skilled in the art, specifically being taught in U.S. Pat. No. 4,415,679 which is incorporated by reference.

The —SO$_3$H form may be converted to a more melt-processible form, such as the —SO$_2$Cl form, using reaction conditions taught in Example 1 of U.S. Pat. No. 4,151,053 which is incorporated by reference; or it may be converted to a melt-processible salt by treatment with a tertiary amine or its salt, or a quaternary ammonium base or its salt using reaction conditions taught in U.S. Pat. No. 3,884,885 which is incorporated by reference. In a variation on this process, the alkali metal salt of the sulfonyl yarn may be converted on the surface to a melt-processible salt by treatment with a tertiary amine or its salt or a quaternary ammonium base or its salt.

Preferably, after conversion of the surface to a more melt-processible form, the core will still be sufficiently oriented and hydrolyzed to have a tenacity of at least 0.5 grams per denier and a tensile modulus of at least 2 grams per denier.

The coated cation exchange fabric may be made from the sheath/core yarn, preferably by weaving or knitting. The weave used in the fabric is not critical, and the maximum yarn count (tightness of weave) is not critical as discussed above.

Alternatively, it may first be made from oriented and hydrolyzed cation exchange resin in yarn or other form followed by a modification or coating of one of both of its surfaces employing the same processes as described above for yarn.

The fabric may be calendered or heat set. An advantage of calendering with heat and light pressure or in any way applying heat and light pressure to the fabric while it is on the loom or immediately after it leaves the loom is that the yarns fuse lightly to one another, stabilizing the fabric against shifting of yarns during handling prior to lamination. The temperature of this step should be above room temperature but below the melting point of the melt-processible coating resin; an effective temperature and pressure can be determined routinely for the process chosen. The pressure should be 1–100 kPa, depending on the process and temperature used. Pressure and heat can be applied using heated calender rolls, with or without release paper or film between the heated roll and the fabric. In a batch process, heated platens may be pressed lightly against the fabric on the loom or immediately after removal from the loom, optionally using a release paper or film between the platen and the fabric.

The method of laminating the cation exchange precursor film or films to the cation exchange fabric is not critical. Several methods have been disclosed in the art, including that used in the Examples.

Preferably, the gas release properties of the membranes are enhanced by providing thereon a gas- and liquid-permeable porous non-electrode layer. Such non-electrode layer can be in the form of a thin hydrophilic coating or spacer and is ordinarily of an inert electroinactive or non-electrocatalytic substance. Such non-electrode layer should have a porosity of 10 to 99%, preferably 30 to 70%, and an average pore diameter of 0.01 to 2000 micrometers, preferably 0.1 to 1000 micrometers, and a thickness generally in the range of 0.1 to 500 micrometers, preferably 1 to 300 micrometers. A non-electrode layer ordinarily comprises an inorganic component and a binder; the inorganic component can be an inorganic compound which is chemically stable in hot concentrated caustic and chlorine, and can be of a type as set forth in UK No. 2,064,586, preferably tin oxide, titanium oxide, zirconium oxide, or an iron oxide such as Fe$_2$O$_3$ or Fe$_3$O$_4$. Other information regarding non-electrode layers on ion-exchange membranes is found in published European Patent Application No. 31660, and in Japanese Laid-open Patent Applications Nos. 56-108888 and 56-112487. The particle size of the inorganic material can be about 1–100 micrometers, and preferably 1–10 micrometers.

The binder component in a non-electrode layer can be, for example, polytetrafluoroethylene, a fluorocarbon polymer at least the surface of which is hydrophilic by virtue of treatment with ionizing radiation in air or a modifying agent to introduce functional groups such as —COOH or —SO$_3$H (as described in published UK Patent Application GB No. 2,060,703A) or treatment with an agent such as sodium in liquid ammonia, a functionally substituted fluorocarbon polymer or copolymer which has carboxylic or sulfonic functional groups, or polytetrafluoroethylene particles modified on their surfaces with fluorinated copolymer having acid type functional groups (GB No. 2,064,586). Such binder can be used in an amount of about from 10 to 50 wt. % of the non-electrode layer or of the electrocatalyst composition layer. In addition to the inorganic component and the binder, the dispersion used to apply the inorganic component can include a thickener such as methyl cellulose or polyvinyl alcohol and a small amount of nonionic surfactant.

Composite structures having non-electrode layers thereon can be made by various techniques known in the art, which include preparation of a decal which is then pressed onto the membrane surface, spray application of a slurry or a liquid composition (for example, dispersion or solution) of the binder followed by drying, screen or gravure printing of compositions in paste form, hot pressing of powders distributed on the membrane surface, and other methods as set forth in British Patent No. 2,064,586 or Japanese Laid-open Patent Application No. J57/89490. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form.

Membranes which carry thereon one or more non-electrode layers can be employed in an electrochemical cell regardless of the distances between the anode, the membrane and the cathode. That is, they are useful in so called finite-gap, narrow-gap and zero-gap configurations.

EXAMPLES

Example 1

A copolymer of TFE and $CF_2=CFOCF_2CF(CF_3)OCF_2CF_2SO_2F$ with a ratio of the two monomers of 6.6:1 was melt spun and melt drawn downward at a temperature of 300° C. through a 6-hole spinneret with a takeoff speed of 75 meters per minute (m/min). The yarn was drawn at a rate of 175 m/min. at 300° C., resulting in a 233% elongation. The tensile properties of both drawn and undrawn ion-exchange yarns were determined:

|  | Drawn | Undrawn |
| --- | --- | --- |
| Tenacity (g/denier) | 0.70 | 0.28 |
| Modulus (g/denier) | 1.1 | 0.5 |
| Orientation angle (degrees) | 15.1 | 18.3 |
| Apparent crystal size (nm) | 5.3 | 6.2 |
| Density (g/cm$^3$) | 2.004 | 2.005 |

Samples of both yarns were wound on an inert porous support and hydrolyzed overnight in a solution of 10% KOH, 30% dimethylsulfoxide, and 60% water. The yarns were then rinsed in water, dried in air, and tested for tensile properties:

|  | Drawn | Undrawn |
| --- | --- | --- |
| Tenacity (g/denier) | 0.71 | 0.38 |
| Modulus (g/denier) | 5.0 | 3.2 |
| Orientation Angle (degrees) | 26.5 | 33.3 |
| Apparent Crystal Size (nm) | 3.1 | 3.0 |
| Density (g/cm$^3$) | 1.830 | 1.862 |

These experiments show that tenacity is about doubled by melt drawing 1x, and modulus is increased 5-6 fold by hydrolysis to the potassium salt form.

Example 2

The drawn, hydrolyzed yarn made in Example 1 was coated with a 10% solution of a similar copolymer with TFE:comonomer ratio of 3.36:1 in $CF_2ClCFCl_2$, using 5 passes and obtaining partial coverage This sample was labeled "Example 2". After hydrolysis was repeated, the fully hydrolyzed yarn was labelled "Fully Hydrolyzed". The tensile properties were determined:

|  | Example 2 | Fully Hydrolyzed |
| --- | --- | --- |
| Tenacity (g/denier) | 0.82 | 0.71 |
| Modulus (g/denier) | 6.1 | 5.4 |
| Density (g/cm$^3$) | 1.862 | 1.862 |

Also, using thermal mechanical analysis, it was found that the sheath/core yarn contracts much less than all-melt-processable yarn at the temperature of lamination.

Example 3

The coated yarn of Example 2 was woven into a fabric with an average yarn density of 1.2 yarns/cm in the warp direction and 1.2 yarns/cm in the weft direction. The fabric was laminated into a membrane by placing the fabric on a 25 micrometer film of the same polymer with a TFE:functional monomer mole ratio of 6.58:1; placing on the fabric a melt-coextruded film containing a 100 micrometer layer of the same sulfonyl polymer and a 38 micrometer layer of a 6.4:1 TFE: $CF_2=CFOCF_2CF(CF_3)OCF_2CF_2COOCH_3$ copolymer; placing the sandwich, ester side up, on a sheet of porous release paper; and applying a vacuum of 71 kPa for 15 seconds while the upper surface is heated radiantly at 225° C.

A control was made which was substantially the same except the fabric was made of PTFE yarn of 200 denier. Both membranes were hydrolyzed in KOH/DMSO/water at 90° C., washed in water, preswelled in 2 wt. % NaOH, and installed in identical laboratory cells with an effective membrane diameter of about 7.5 cm. The cathode was a mild steel, the anode was activated with a coating containing ruthenium oxide, and the membrane was urged against the anode by catholyte head. Purified brine was used. Electrolysis was carried out at 90° C. and 3.1 kA/m$^2$ current density to make 32 wt. % NaOH. The sample had lower voltage and the control had higher caustic current efficiency. The results in the following table (power consumption in kilowatt hours/metric ton of sodium hydroxide) show a desirable lower power consumption was achieved versus the control.

|  | Sample | Control |
| --- | --- | --- |
| Days on line | 14 | 21 |
| Final power consumption (kWH/MT) | 2410 | 2445 |
| Average of daily readings after level operation, power consumption | 2407 | 2441 |
| Final current efficiency (%) | 95.7 | 97.0 |
| Range of daily readings, current efficiency (%) | 94.6–97.0 | 91.1–98.5 |
| Final cell voltage | 3.44 | 3.54 |
| Range of cell voltage | 3.42–3.45 | 3.53–3.60 |

Example 4

Example 2 is repeated, except the sulfonyl polymer used in the yarn and the sulfonyl films is made from $CF_2=CFOCF_2CF_2SO_2F$ (see a paper by Ezzell et al. presented at the AIChE meeting in Houston on 3/27/85) and has a mole ratio of 11.8:1. The yarn is laminated with a 75 micrometer film of the same copolymer, total thickness of this copolymer in the laminated membrane is only 75 micrometers. The hydrolyzed yarn is dip coated with a 1,2-dibromotetrafluoroethane solution of a polymer made from the same monomers, as described in Example 1 of U.S. Pat. No. 4,650,551. After drying, the coated yarn is woven into a fabric as in Example 3 except the yarn count is 3 yarns/cm in both warp and weft directions. The fabric is stabilized by placing it between sheets of release paper and pressing at 10 kPa at 150° C. in a press. This makes the fabric stable, even during manual handling. The stabilized fabric is laminated and used in electrolysis as in Example 3. The voltage is lower than that of a control with PTFE reinforcement of 200 denier.

Example 5

Example 4 is repeated, except the sulfonyl polymer used in the yarn and the sulfonyl films is made from $TFE:CF_2=CFO[CF_2CF(CF_3)O]_2OCF_2CF_2SO_2F$ and has a mole ratio of 2.8:1, and the hydrolyzed, oriented core yarn is coated with a liquid composition according to Example 2 of U.S. Pat. No. 4,433,082. The current efficiency and voltage are about the same as those in Example 2.

Example 6

Example 3 was repeated except the film on the cathode side was 50 micrometers thick and had a $TFE:CF_2=CFOCF_2CF(CF_3)OCF_2CF_2SO_2F$ ratio of 9.1:1 and that on the anode side was 125 micrometers thick and had a $TFE:CF_2=CFOCF_2CF(CF_3)OCF_2CF_2SO_2F$ ratio of 6.6:1. The control was identical to the sample, except the reinforcement was made of PTFE yarn of 200 denier. The electrolysis test was the same except the NaOH concentration was 20 wt. %, still a little too high for optimum performance of this membrane The results were:

|  | Sample | Control |
| --- | --- | --- |
| Days on line | 11 | 11 |
| Final caustic current efficiency (%) | 72.2 | 71.6 |
| Range of daily readings, current efficiency (%) | 70.4–72.6 | 63.8–71.9 |
| Final cell voltage | 3.49 | 3.59 |
| Range of daily cell voltages | 3.37–3.49 | 3.39–3.59 |

This example demonstrates the invention in an all-sulfonic membrane.

Example 7

Example 3 is repeated except the yarn density is 30 yarns/cm in each of the warp and weft directions. The cell voltage is substantially the same as in Example 3.

We claim:
1. A cation exchange yarn comprising:
   (a) an inner core, said inner core comprising a fluorinated cation exchange copolymer having a mole ratio of non-functional to functional monomer of about 2.8–11.8:1, being first oriented and then hydrolyzed sufficiently to achieve a tenacity of at least 0.5 grams per denier and a tensile modulus of at least 2 grams per denier, and having a denier of between 50 and 400 after orientation and
   (b) an outer coating on the inner core, said outer coating comprising a melt-fabricable form of a fluorinated cation exchange copolymer having mole ratio of non-functional to functional monomer differing from that of the core by no more than 3 units.

2. The yarn of claim 1 wherein the core copolymer has carboxylic ion-exchange groups on pendant side chains.
3. The yarn of claim 1 wherein the core copolymer has sulfonic ion-exchange groups on pendant side chains.
4. The yarn of claim 2 wherein the outer coating is a melt-fabricable carboxyl form of the fluorinated cation exchange copolymer.
5. The yarn of claim 3 wherein the outer coating is a melt-fabricable sulfonyl form of the fluorinated cation exchange copolymer.
6. The yarn of claim 4 wherein mole ratios of non-functional to functional monomers in the inner core and in the outer coating differ by no more than 1 unit.
7. The yarn of claim 5 wherein mole ratios of non-functional to functional monomers in the inner core and in the outer coating differ by no more than 1 unit.
8. The yarn of claim 4 wherein the coating has —COOR end groups, where R is lower alkyl, on the pendant side chains, the non-functional monomer is tetrafluoroethylene (TFE) and the ratio of TFE:functional monomer in the coating is essentially the same as the ratio in the inner core.
9. The yarn of claim 5 wherein the coating has —SO$_2$F end groups on the pendant side chains, the non-functional monomer is tetrafluorethylene (TFE) and the ratio of TFE:functional monomer in the coating is essentially the same as the ratio in the inner core.
10. A process for making the yarn of claim 1 comprising the following steps:
    (A) orienting a melt-processible yarn sufficiently to achieve a tenacity of at least 0.5 grams/denier upon hydrolysis, said yarn having a denier between 50 and 400 after orientation and being made of a fluorinated cation exchange copolymer precursor in which the mole ratio of non-functional:functional monomer is 2.8–11.8:1;
    (B) hydrolyzing the oriented yarn at least to the degree required to provide a minimum tensile modulus of 2 grams/denier; and then
    (C) at least partially coating the oriented, hydrolyzed yarn (inner core) with a melt-fabricable form of a fluorinated cation exchange copolymer in the form of a solution, dispersion or other liquid composition, said fluorinated cation exchange copolymer in melt-fabricable form having a mole ratio of non-functional:functional monomer differing from that in step A by no more than 3 units.
11. The process of claim 10 wherein the orientation in step A is accomplished by stretching the yarn to at least two times its original length.
12. The process of claim 10 wherein the mole ratio of non-functional:functional monomer is 5.3–7.5:1 and the difference between that of the coating and that of the inner core is no more than 1 unit.
13. The process of claim 10 wherein the fluorinated cation exchange copolymer precursor is a copolymer in which the functional monomer is a sulfonyl monomer, a carboxyl monomer or a combination of sulfonyl and carboxyl monomers and the non-functional monomer is tetrafluoroethylene.
14. The process of claim 13 wherein the functional monomer is a sulfonyl or carboxyl monomer.
15. A process for making the yarn of claim 1 comprising contacting the inner core, said inner core copolymer having —COOalkali metal or —SO$_3$alkali metal end groups, with an aqueous mineral acid at conditions sufficient to convert the surface to form an outer coating that is more melt-processible than the inner core.

16. The process of claim 15 wherein the mineral acid is 5-10 wt. % HCl or HNO$_3$.

17. The process of claim 15 wherein the outer coating copolymer has —COOH end groups, the process further comprising a subsequent step of esterification at conditions to convert to the —COOR form, where R is lower alkyl.

18. The process of claim 15 wherein the outer coating copolymer has —SO$_3$H end groups, the process further comprising a step of then contacting the yarn with a tertiary amine or its salt or a quaternary ammonium base or its salt at conditions sufficient to convert the surface —SO$_3$H end groups to a more melt-processible form.

* * * * *

UNITED STATES PATENT AND TRADEMARK OFFICE
CERTIFICATE OF CORRECTION

PATENT NO. : 4,988,364

DATED : Jan. 29, 1991

INVENTOR(S) : Perusich et al.

It is certified that error appears in the above-identified patent and that said Letters Patent is hereby corrected as shown below:

Column 18, line 1, delete:

"conditions to convert to"

Column 18, line 1, add:

--conditions sufficient to convert the surface to--

Signed and Sealed this

Ninth Day of June, 1992

*Attest:*

DOUGLAS B. COMER

*Attesting Officer*      *Acting Commissioner of Patents and Trademarks*